United States Patent  
Chen et al.

(10) Patent No.: US 11,376,535 B2  
(45) Date of Patent: Jul. 5, 2022

(54) EFFICIENT MICROFLUIDIC PARTICULATE MATTER (PM) REMOVAL DEVICE USING STAGGERED HERRINGBONE MICROMIXERS

(71) Applicant: The Hong Kong University of Science and Technology, Hong Kong (CN)

(72) Inventors: Yangfan Chen, Hong Kong (CN); Ho Nam Chan, Hong Kong (CN); Hongkai Wu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 385 days.

(21) Appl. No.: 16/401,402

(22) Filed: May 2, 2019

(65) Prior Publication Data
US 2019/0336898 A1    Nov. 7, 2019

Related U.S. Application Data

(60) Provisional application No. 62/762,374, filed on May 3, 2018.

(51) Int. Cl.
*B01D 45/12* (2006.01)
*B01D 45/16* (2006.01)
(Continued)

(52) U.S. Cl.
CPC ............. *B01D 45/16* (2013.01); *B01D 45/10* (2013.01); *B01L 3/502761* (2013.01);
(Continued)

(58) Field of Classification Search
CPC ........ B01D 45/16; B01D 45/10; B01D 49/00; B01L 3/502761; B01L 2300/0861;
(Continued)

(56) References Cited

U.S. PATENT DOCUMENTS 5,803,600 A * 9/1998 Schubert ............... B01F 5/0256  
138/38  
7,445,676 B2    11/2008 Martin et al.  
(Continued)

OTHER PUBLICATIONS

"Particulate Matter (PM) Basics," Web page <https://www.epa.gov/pm-pollution/particulate-matter-pm-basics#PM>, 3 pages, Nov. 16, 2018, retrieved from Internet Archive Wayback Machine <https://web.archive.org/web/20181116082528/https://epa.gov/pm-pollution/particulate-matter-pm-basics> on Apr. 4, 2014.

(Continued)

*Primary Examiner* — Dung H Bui  
(74) *Attorney, Agent, or Firm* — Saliwanchik, Lloyd & Eisenschenk

(57) ABSTRACT

Microfluidic devices to efficiently remove particulate matter (PM) in air are provided, as are methods of fabricating and using the same. A device can include a channel having a structure configured to generate chaotic advective flow in air within the channel. The channel structure can include a plurality of SHMs disposed within the channel, where each SHM comprises a plurality of grooves each having a width of 200 μm or less and a spacing between each groove of 200 μm or less. The plurality of SHMs can be configured to introduce microvortices in air flow within the channel.

10 Claims, 13 Drawing Sheets

(51) Int. Cl.
    *B01D 45/10*           (2006.01)
    *B01L 3/00*            (2006.01)
    *B01D 49/00*           (2006.01)
    *A62B 7/10*            (2006.01)
    *A62B 9/06*            (2006.01)
(52) U.S. Cl.
    CPC . *A62B 7/10* (2013.01); *A62B 9/06* (2013.01); *B01D 49/00* (2013.01); *B01L 2300/0861* (2013.01); *B01L 2300/12* (2013.01)
(58) Field of Classification Search
    CPC .......... B01L 2300/0887; B01L 2300/12; B01F 13/0096; B01F 13/0061; B01F 13/0064; B01F 13/0074; A62B 7/10; A62B 9/06
    See application file for complete search history.

(56) References Cited

U.S. PATENT DOCUMENTS

| | | | |
|---|---|---|---|
| 7,909,502 B2* | 3/2011 | Ehrfeld | B01F 5/0604 366/340 |
| 8,444,922 B2 | 5/2013 | Kusuura | |
| 9,789,484 B2 | 10/2017 | Chawke et al. | |
| 10,087,440 B2* | 10/2018 | Lofquist | B01L 3/502753 |
| 2005/0232076 A1* | 10/2005 | Yang | B01F 13/0059 366/336 |
| 2005/0274257 A1 | 12/2005 | Reznik | |
| 2007/0006578 A1 | 1/2007 | Tanaami et al. | |
| 2007/0207055 A1* | 9/2007 | Marchand | B01L 3/502707 422/400 |
| 2007/0263485 A1* | 11/2007 | Yang | B01F 5/061 366/336 |
| 2008/0008911 A1* | 1/2008 | Stroock | H01M 8/026 429/447 |
| 2008/0066621 A1 | 3/2008 | Naito et al. | |
| 2010/0022680 A1* | 1/2010 | Karnik | B01F 11/0071 523/105 |
| 2010/0216126 A1* | 8/2010 | Balachandran | B01L 3/50273 435/6.11 |
| 2013/0228950 A1* | 9/2013 | DeSimone | B29C 66/727 264/226 |
| 2014/0146636 A1* | 5/2014 | Dillion | C03C 15/00 366/337 |
| 2014/0212986 A1* | 7/2014 | Angelescu | E21B 47/02 436/180 |
| 2015/0352242 A1 | 12/2015 | Ando et al. | |
| 2016/0091489 A1* | 3/2016 | Fan | G01N 33/54386 435/7.23 |
| 2016/0244807 A1* | 8/2016 | Conoci | B01L 7/52 |
| 2017/0080373 A1 | 3/2017 | Engelhard | |
| 2017/0082305 A1 | 3/2017 | Law | |
| 2017/0336312 A1 | 11/2017 | Stoeber et al. | |
| 2019/0308190 A1* | 10/2019 | Mao | G01N 33/543 |

OTHER PUBLICATIONS

Brook R. D. et al., "Air Pollution and Cardiovascular Disease A Statement for Healthcare Professionals From the Expert Panel on Population and Prevention Science of the American Heart Association," *Circulation*, Jun. 1, 2004, 109:2655-2671, American Heart Association, Inc.
Dockery, D. W. et al., "An Association Between Air Pollution and Mortality in Six U.S. Cities," *The New England Journal of Medicine*, Dec. 9, 1993, 329(24):1753-1759, Massachusetts Medical Society.
Nel, A., "Air Pollution-Related Illness: Effects of Particles," *Science*, May 6, 2005, 308:804-806, AAAS.
Chow, J. C. et al., "Health Effects of Fine Particulate Air Pollution: Lines that Connect," *Journal of the Air & Waste Management Association*, Oct. 2006, 56:1369-1380, Air & Waste Management Association.
Harrison, R. M. et al., "Particulate matter in the atmosphere: which particle properties are important for its effects on health?" *The Science of the Total Environment*, 2000, 249:85-101, Elsevier Science B.V.
World Health Organization Europe, "Air Quality Guidelines Global Update 2005," 2005, pp. 1-496, World Health Organization 2006.
Samet, J. M. et al., "Fine Particulate Air Pollution and Mortality in 20 U.S. Cities, 1987-1994," *The New England Journal of Medicine*, Dec. 14, 2000, 343(24):1742-1749, Massachusetts Medical Society.
Seaton, A. et al., "Particulate air pollution and acute health effects," *The LANCET*, 1995, 345:176-178.
Anenberg, S. C. et al., "An Estimate of the Global Burden of Anthropogenic Ozone and Fine Particulate Matter on Premature Human Mortality Using Atmospheric Modeling," *Environmental Health Perspectives*, Sep. 2010, 118(9):1189-1195.
Underwood, E., "The Polluted Brain Evidence builds that dirty air causes Alzheimer's, dementia," Web page <https://www.sciencemag.org/news/2017/01/brain-pollution-evidence-builds-dirty-air-causes-alzheimer-s-dementia#main-content>, 15 pages, retrieved on Apr. 4, 2019.
Zhang, R. et al., "Chemical characterization and source apportionment of $PM_{2.5}$ in Beijing: seasonal perspective," *Atmospheric Chemistry and Physics*, 2013, 13:7053-7074, Copernicus Publications on behalf of the European Geosciences Union.
Rohde, R. A. et al., "Air Pollution in China: Mapping of Concentrations and Sources," *PLoS ONE*, Aug. 20, 2015, 10(8):1-14.
Sievert, J. et al., "Fabric Cleaning in Pulse-Jet Filters," *Chem. Eng. Process.*, 1989, 26:179-183, Elsevier Sequoia.
Li, P. et al., "Air Filtration in the Free Molecular Flow Regime: A Review of High-Efficiency Particulate Air Filters Based on Carbon Nanotubes," *small*, 2014, 10(22):4543-4561, Wiley-VCH Verlah GmbH & Co. KGaA, Weinheim.
Liu, C. et al., "Transparent air filter for high-efficiency $PM_{2.5}$ capture," *Nature Communications*, 6(6205):1-9, Macmillan Publisher's Limited.
Zhang, R. et al., "Nanofiber Air Filters with High-Temperature Stability for Efficient $PM_{2.5}$ Removal from the Pollution Sources," *Nano Letters*, 2016, pp. 1-11, American Chemical Society.
Wang, N. et al., "Tunable fabrication of three-dimensional polyamide-66 nano-fiber/nets for high efficiency fine particulate filtration," *Journal of Materials Chemistry*, 2012, 22:1445-1452, The Royal Society of Chemistry.
Yoon, K. et al., "Functional nanofibers for environmental applications," *Journal of Materials Chemistry*, 2008, 18:5326-5334, The Royal Society of Chemistry.
Ahn, Y. C. et al., "Development of high efficiency nanofilters made of nanofibers," *Current Applied Physics*, 2006, 6:1030-1035, Elsevier B. V. 2005.
Zhang, Y. et al., "Preparation of Nanofibrous Metal-Organic Framework Filters For Efficient Air Pollution Control," *Journal of the American Chemical Society*, 2016, 138:5785-5788, American Chemical Society.
Kim, Y. et al., "Micromachined cascade virtual impactor with a flow rate distributor for wide range airborne particle classification," *Applied Physics Letters*, 2007, 91:1-4, American Institute of Physics.
Paprotny, I. et al., "Microfabricated air-microfluidic sensor for personal monitoring of airborne particulate matter: Design, fabrication, and experimental results☆," *Sensors and Actuators A: Physical*, 2013, 201:506-516, 2012 Elsevier B. V.
Hong, S. C. et al., "Continuous aerosol size separator using inertial microfluidics and its application to airborne bacteria and viruses †," *Lab Chip*, 2015, 15:1889-1897, The Royal Society of Chemistry.
Schaap, A. M. et al., "Continuous Size-Separation of Airborne Particles in a Microchannel for Aerosol Monitoring," *IEEE Sensors Journal*, Nov. 2011, 11(11):2790-2797, IEEE.
Mirzaee, I. et al., "A microfluidics-based on-chip impinger for airborne particle collection," *Lab Chip*, 2016, pp. 1-11, The Royal Society of Chemistry.
Xia, Y. et al., "Soft Lithography," *Annu. Rev. Mater. Sci.*, 1998, 28:153-184, Annual Reviews.

(56) References Cited

OTHER PUBLICATIONS

Chen, Y. et al., "Roll-to-Roll Production of Metal-Organic Framework Coatings for Particulate Matter Removal," *Advanced Materials*, 2017, pp. 1-6, WILEY-VCH Verlag GmbH & Co. KGaA, Weinheim.
Stroock, A. D. et al., "Chaotic Mixer for Microchannels," *SCIENCE*, Jan. 25, 2002, 295:647-651.
Lee, C. et al., "Microfluidic Mixing: A Review," *International Journal of Molecular Sciences*, 2011, 12:3263-3287.
Nguyen, N. et al., "Micromixers—a review," *Journal of Micromechanics and Microengineering*, 2005, 15:R1-R16, IOP Publishing Ltd.
Wang, S. et al., "Highly Efficient Capture of Circulating Tumor Cells by Using Nanostructured Silicon Substrates with Integrated Chaotic Micromixers**," *Angewandte Chemie International Edition*, 2011, 50:3084-3088, Wiley-VCH Verlag GmbH & Co. KGaA, Weinheim.
Stott, S. L. et al., "Isolation of circulating tumor cells using a microvortex-generating herringbone-chip," *PNAS*, Oct. 26, 2010, 107(43):18392-18397.
Sheng, W. et al., "Capture, release and culture of circulating tumor cells from pancreatic cancer patients using an enhanced mixing chip †," *Lab Chip*, 2014, 14:89-98, The Royal Society of Chemistry.
Hsu, C. et al., "Microvortex for focusing, guiding and sorting of particles † ‡," *Lab Chip*, 2008, 8:2128-2134, The Royal Society of Chemistry.
Jing, W. et al., "Microfluidic Device for Efficient Airborne Bacteria Capture and Enrichment," *Analytical Chemistry*, 2013, 85:5255-5262, American Chemical Society.
Lund-Olesen, T. et al., "Capture of DNA in microfluidic channel using magnetic beads: Increasing capture efficiency with integrated microfluidic mixer," *Journal of Magnetism and Magnetic Materials*, 2007, 311:396-400, 2006 Elsevier B.V.
Foley, J. O. et al., "Experimental and model investigation of the time-dependent 2-dimensional distribution of binding in a herringbone microchannel †," *Lab Chip*, 2008, 8:557-564, The Royal Society of Chemistry.
Femmer, T. et al., "Efficient gas-liquid contact using microfluidic membrane devices with staggered herringbone mixers †," *Lab Chip*, 2015, 15:3132-3137, The Royal Society of Chemistry.
Lehmann, M. et al., "On-chip recalcification of citrated whole blood using a microfluidic herringbone mixer," *BIOMICROFLUIDICS*, 2015, 9:1-14, AIP Publishing LLC.
Forbes, T. P. et al., "Engineering and analysis of surface interactions in a microfluidic herringbone micromixer †," *Lab Chip*, 2012, 12:2634-2637, The Royal Society of Chemistry.
Du, Y. et al., "A simplified design of the staggered herringbone micromixer for practical applications," *BIOMICROFLUIDICS*, 2010, 4:1-14, American Institute of Physics.
Williams, M. S. et al., "A practical guide to the staggered herringbone mixer," *Lab Chip*, 2008, 8:1121-1129, The Royal Society of Chemistry.
Jing, W. et al., "Microfluidic Platform for Direct Capture and Analysis of Airborne *Mycobacterium tuberculosis*," *Analytical Chemistry*, 2014, 86:5815-5821, American Chemical Society.
Beebe, D. J. et al., "Physics and Applications of Microfluidics in Biology," *Annu. Rev. Biomed. Eng.*, 2002, 4:261-286, Annual Reviews.
Bian, X. et al., "Microfluidic Air Sampler for Highly Efficient Bacterial Aerosol Collection and Identification," *Analytical Chemistry*, 2016, 88:11504-11512, American Chemical Society.

\* cited by examiner

FIG. 4a
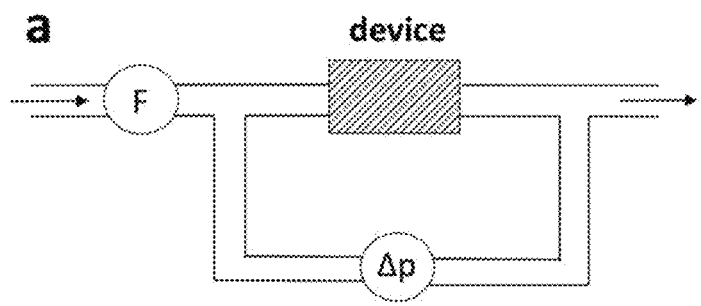
FIG. 4b
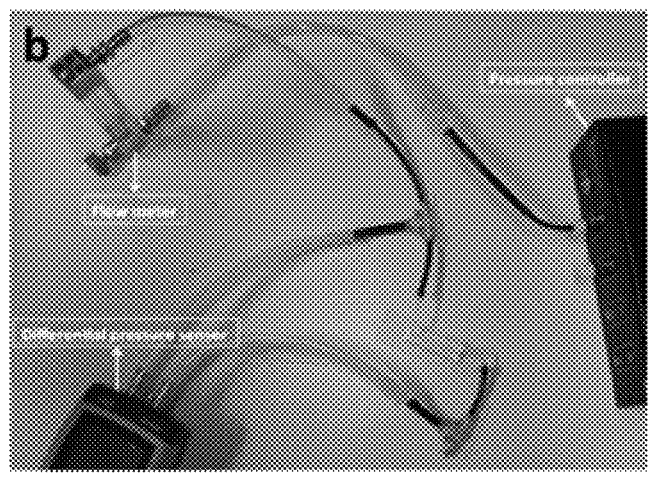
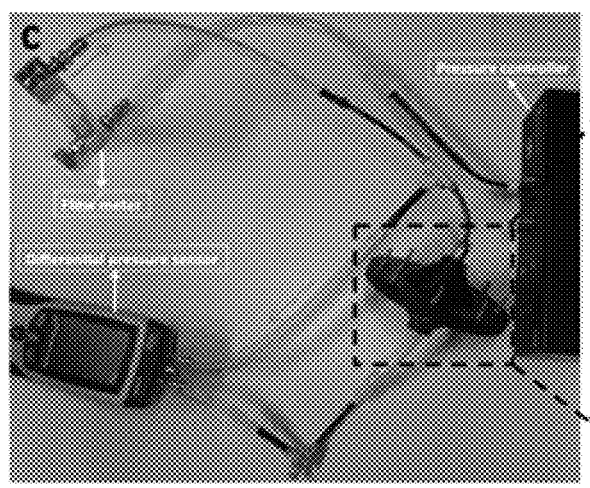
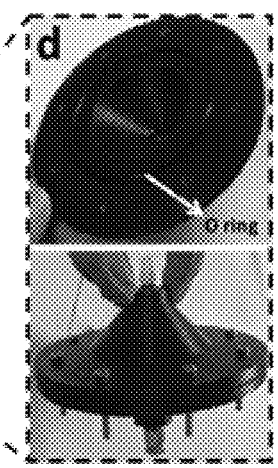
FIG. 4c  FIG. 4d

FIG. 5a
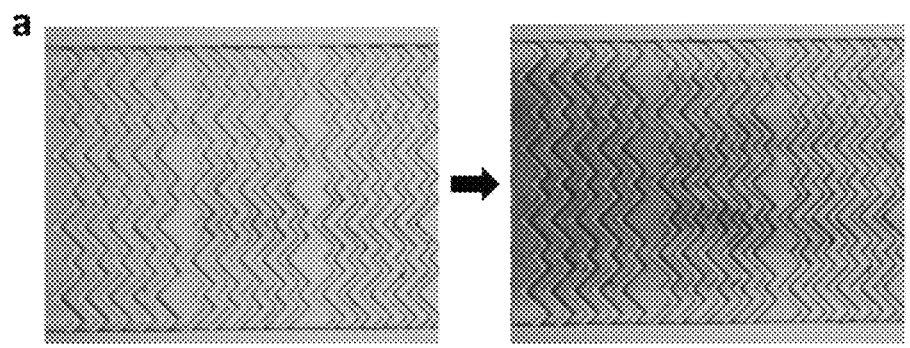
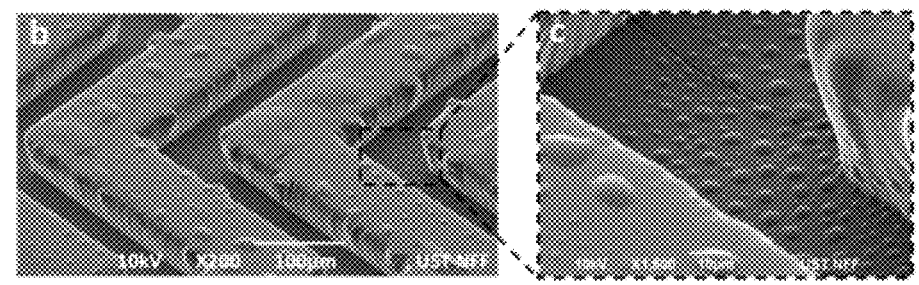
FIG. 5b                FIG. 5c

EFFICIENT MICROFLUIDIC PARTICULATE MATTER (PM) REMOVAL DEVICE USING STAGGERED HERRINGBONE MICROMIXERS

CROSS-REFERENCE TO RELATED APPLICATION

This application claims the benefit of U.S. Provisional Application Ser. No. 62/762,374, filed May 3, 2018, which is hereby incorporated by reference in its entirety including any tables, figures, or drawings.

BACKGROUND

Particulate matter (PM) has recently become one of the most serious types of air pollution and tremendously affects human living. According to The United States Environmental Protection Agency (EPA), PM, which is also referred to as particle pollution, is defined as a complex mixture of extremely small particles and liquid droplets, and it is identified as one of the six major pollutants in the air.[1] For PM, particles with a diameter less than 10 μm ($PM_{10}$, inhalable coarse particles) are of concern because they can pass through the human respiratory tract and those particles with a diameter less than 2.5 μm ($PM_{2.5}$, fine particles) can eventually reach the lung and even enter into blood.[2,3] Most PM present in the atmosphere are from chemical reactions between pollutants such as sulfur dioxide and nitrogen dioxides emitted from human activities such as power plants, industries, and automobiles. Because of the diverse sources of PM, its content is complicated and includes nitrates, sulfates, silicates, organic chemicals, metals, soil, and dust particles.[4-6] Therefore, PM poses a serious threat to human health due to its small size and toxic components. Many epidemiological studies have shown that PM can induce a wide range of adverse health effects, predominantly in respiratory and cardiovascular systems, and long-term exposure to PM increases morbidity and mortality.[2-10] More evidence suggests that exposure to PM can also be harmful to the brain (e.g., Alzheimer's disease and other types of dementia).[11] Even for healthy people, short-term exposure to PM can cause irritation of airways, coughing, or difficulty in breathing.[1,7] The harmful effects of PM is a worldwide issue, particularly in developing countries due to higher levels and longer duration of particle pollution caused by escalating increases in the number of motor vehicles and energy consumption.[12] For example, from April to August in 2014, 92% of China's population experienced at least 120 hours of unhealthy air and 46% of China's population experienced at least 1 hour with $PM_{2.5}$ exceeding the highest level set by the EPA ("Hazardous", >250 μg/m³).[13]

Due to the detrimental effects of PM, various types of industrial PM control technology have been developed to attempt to prevent or inhibit PM emission. Typical technologies include baghouse dust collectors, cyclones, electrostatic precipitation, and wet scrubbers. Baghouse dust collectors utilizes fabric filter bags while cyclones adopt centrifugal and inertial forces to remove PM from the air. Both of these are frequently-used PM separators, and they are primarily used to control coarse PM (>10 μm) and their PM collection efficiencies are relatively low.[14,15] Electrostatic precipitation and wet scrubbers can remove fine particles in the gas stream, though the former needs high voltage supplied and the latter can only work in the presence of extraction liquid, which results in these two technologies requiring complicated design and expensive setup.[16,17] Apart from industrial control technology, personal protection equipment (PPE) is necessary to protect individuals when they are exposed to PM in a harmful environment. Facial masks or respirators, which are based on mechanical filtration, are the most common PPE used to remove PM.[18] On the basis of fabrication, filters for PPE can be classified into two types. One type is a porous filter featuring numerous pores in a supporting substrate, and PM larger than the pore sizes cannot pass through these filters. Because of the small pore sizes and low porosity (<30%), the efficiency is high with the sacrifice being low air flow. The other type of PPE is a fibrous filter fabricated by stacking many layers of fibers with diameters ranging from a few microns to tens of microns. Although the porosity is high (>70%), this type of filter is usually thick and requires a compromise between filtration efficiency and air flow. Recently, nanofibers with diameters of a few hundreds of nanometers have been used in air filtration and show high filtration efficiency with relatively high transparency.[19-25] However, this technology usually requires an electrospinning technique to deposit nanofibers onto mesh substrates, which limits the options of fiber materials, requires toxic solvents for dissolving polymers, and hinders mass production.

Microfluidic systems have been used to directly separate, collect, and detect aerosols (e.g., particles, bacteria and viruses) in the air.[26-30] Based on inertial differences, aerosols with different sizes can be separated into corresponding channels and collected or detected in desired regions on microfluidic chips. For example, in micro-scale virtual impactors, small aerosols can follow the major air flow, changing direction accordingly, while large aerosols cannot redirect instantly, thus following the minor air flow to other outlets.[26,27] Further, because of inherent laminar flow in microfluidic devices, aerosols can be focused into desired regions of channels by applying sheath air flows. For example, when passing a curved channel, larger aerosols move further radially outward at the end of the curve with the presence of sheath flows; therefore, aerosols can be separated and collected with careful designs of curved channels and positions of outlets.[28,29] Moreover, a micro-impinger has been developed to sample and collect aerosols in the extraction liquid.[30] These applications demonstrate the great potential of microfluidic devices for aerosol technology.

BRIEF SUMMARY

Embodiments of the subject invention provide microfluidic devices that generate chaotic advective flow (e.g., by introducing flow microvortices) to efficiently remove particulate matter (PM) in air (e.g., polluted air), as well as methods of fabricating and using the same. Such devices can include staggered herringbone micromixers (SHMs), and the SHMs can be embedded on the inner surface of channels. The SHMs can introduce flow microvortices to break laminar and uniaxial flow conditions and maximize the interactions between PM and the channel surface. Therefore, PM can be removed when attaching to the channel surface. For $PM_{2.5}$ (particulate matter with a diameter of less than 2.5 μm) and $PM_{2.5-10}$ (particulate matter with a diameter of from 2.5 μm to 10 μm) removal, two designs of SHMs can be used. A channel with 100 μm wide grooves can be used, and a comparison can show that this configuration is advantageous. Such a configuration can have >90% and >99% removal efficiencies for $PM_{2.5}$ and $PM_{2.5-10}$, respectively. As confirmed with numerical simulation, microvortices can be generated by SHMs in the air flow and contribute to chaotic mixing, enhancing the change of streamline in the air flow. The efficient removal is due, at least in part if not completely, to this chaotic mixing effect, which significantly increases the chance of collision between PM particles and channel surface. As typical mechanisms for airborne particle removal, diffusional collection, interception, and inertial impaction can help explain the PM removal process. Moreover, compared with related art particulate masks, devices of embodiments of the subject invention can supply the same range of flow rate with smaller cross sectional area and lower pressure drop. For removal of $PM_{2.5}$, the device can maintain 90% removal efficiency for at least 30 minutes under the highest polluted level set by The United States Environmental Protection Agency (EPA). The device can be used for PM removal or collection on microfluidic platforms and can also be used in home air purifiers, personal protection equipment (PPE), ventilation facilities, and motor vehicles exhaust filtration.

BRIEF DESCRIPTION OF THE DRAWINGS

FIG. 2b shows a photograph of the experimental setup of FIG. 2a.

FIG. 4a shows a schematic of an experimental setup for pressure drop measurement across a microfluidic device.

FIG. 4b shows a photograph of the experimental setup of FIG. 4a.

FIG. 4c shows a schematic of an experimental setup for pressure drop measurement across a related art particulate mask.

FIG. 4d shows a close-up of a portion of the experimental setup of FIG. 4c.

FIG. 5a shows micrographs of a polydimethylsiloxane (PDMS) surface before (left) and after (right) attachment of PM.

FIG. 5b shows scanning electron microscope (SEM) images showing the details of PM attachment and accumulation on the PDMS surface.

FIG. 5c shows a magnified version of the square outline portion in FIG. 5b.

DETAILED DESCRIPTION

Figure 1A:
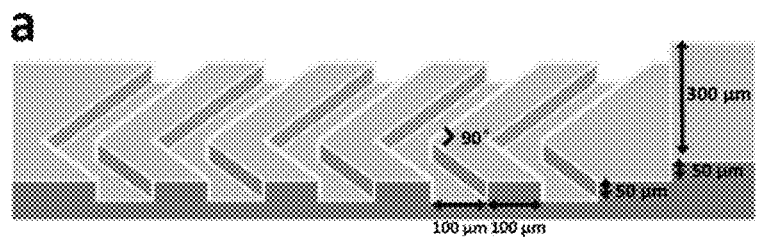
FIGS. 1a-1d show schematic diagrams and micrographs showing designs of staggered herringbone micromixers (SHMs) according to embodiments of the subject invention.
Figure 1B:
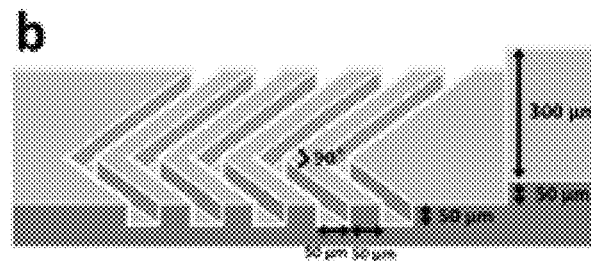
Figure 1C:
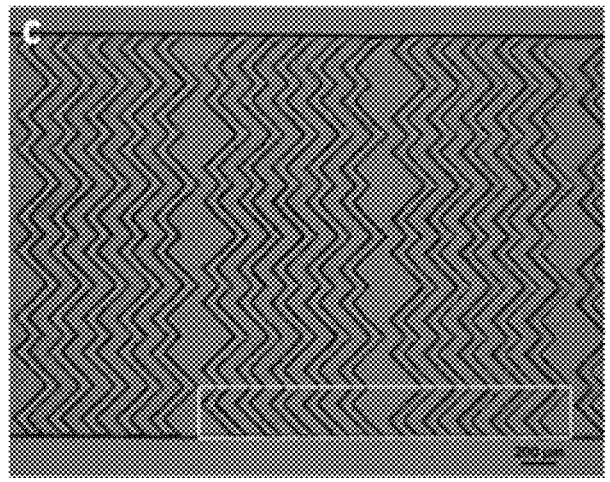
Figure 1D:
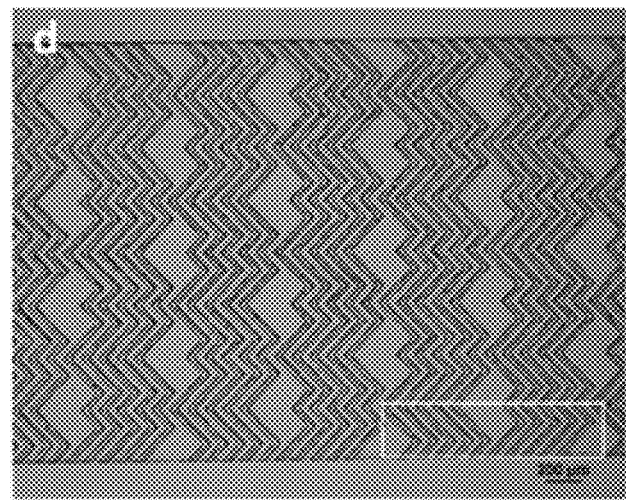

Embodiments of the subject invention provide microfluidic devices that generate chaotic advective flow (e.g., by introducing flow microvortices) to efficiently remove particulate matter (PM) in air (e.g., polluted air), as well as methods of fabricating and using the same. Such devices can include staggered herringbone micromixers (SHMs), and the SHMs can be embedded on the inner surface of channels. The SHMs can introduce flow microvortices to break laminar and uniaxial flow conditions and maximize the interactions between PM and the channel surface. Therefore, PM can be removed when attaching to the channel surface. For $PM_{2.5}$ (particulate matter with a diameter of less than 2.5 μm) and $PM_{2.5-10}$ (particulate matter with a diameter of from 2.5 μm to 10 μm) removal, two designs of SHMs can be used. A channel with 100 μm wide grooves can be used, and a comparison can show that this configuration is advantageous. Such a configuration can have >90% and >99% removal efficiencies for $PM_{2.5}$ and $PM_{2.5-10}$, respectively. As confirmed with numerical simulation, microvortices can be generated by SHMs in the air flow and contribute to chaotic mixing, enhancing the change of streamline in the air flow. The efficient removal is due, at least in part if not completely, to this chaotic mixing effect, which significantly increases the chance of collision between PM particles and channel surface. As typical mechanisms for airborne particle removal, diffusional collection, interception, and inertial impaction can help explain the PM removal process. Moreover, compared with related art particulate masks, devices of embodiments of the subject invention can supply the same range of flow rate with smaller cross-sectional area and lower pressure drop. For removal of $PM_{2.5}$, the device can maintain 90% removal efficiency for at least 30 minutes under the highest polluted level set by The United States Environmental Protection Agency (EPA). The device can be used for PM removal or collection on microfluidic platforms and can also be used in home air purifiers, personal protection equipment (PPE), ventilation facilities, and motor vehicles exhaust filtration.

In an embodiment, a microfluidic device can comprise a structure (e.g., a polydimethylsiloxane (PDMS) (e.g., RTV615, GE Silicones, USA) structure) bonded to a slab (e.g., a PDMS slab), and this can be done using, for example, standard soft lithography techniques[31]. Two-layer masters can be fabricated by photolithography patterning negative photoresist (e.g., SU-8 (MicroChem, USA)), onto a substrate, such as a silicon wafer. The device layout can be designed in AutoCAD (AutoDesk Inc.) to produce a film photomask containing desired patterns. The substrate (e.g., silicon wafer) can be first spin-coated (e.g., with a 50 µm height SU-8 2050 at 3000 rpm). After soft baking (e.g., at 95° C. for 7 min), UV light exposure through the photomask with channel patterns, and post exposure baking (e.g., at 95° C. for 6 min) and development, the main channel layer can be fabricated. Then, another layer of photoresist (e.g., SU-8 2050) (e.g., with a 100 µm height) can be spun on the same substrate (e.g., spun at 1750 rpm). After soft baking (e.g., at 95° C. for 16 min) and precise alignment between main channels and SHMs patterns, a second UV light exposure can be performed, followed by post exposure baking (e.g., at 95° C. for 9 min) and development. The masters can be coated (e.g., by trichloro(1H,1H,2H,2H-perfluorooctyl)silane (PFOTS, Sigma-Aldrich)) to facilitate release of replica. The starting material or precursor (e.g., PDMS (10:1, weight ratio of prepolymer:curing agent)) can be cast on the masters and baked (e.g., in an oven at, for example, 80° C. for 3 hours). After peeling off from the masters, the structures (e.g., PDMS structures) can be punched to generate inlets and outlets. Slabs (e.g., PDMS slabs) can be fabricated by curing the material (e.g., PDMS (10:1)), for example in a glass Petri dish at 80° C. for 3 hours. Then the structure (e.g., PDMS structure) and slab (e.g., PDMS slab) can be irreversibly bonded (for example, with plasma treatment (PDC-32 G, Harrick Plasma) for 30 seconds at high power setting (e.g., 18 W)). FIGS. 1(a)-1(d) show schematic diagrams and micrographs of two designs of SHMs according to embodiments of the subject invention. Referring to FIGS. 1(a)-1(d), the main channel can be, for example, 2.4 mm wide, 50 µm high, and 50 mm long with 50 µm high herringbone grooves embedded on the ceiling. The grooves can be, for example, 100 µm or 50 µm wide and spaced 100 µm or 50 µm apart from each other. Each cycle of SHMs can include 10 grooves, and the patterns can be alternated for each half cycle in a mirrored direction.

FIGS. 13a-13i shows channel designs that generate chaotic advection according to embodiments of the subject invention. Each of the channel designs shows potential flow (solid and dashed lines) and solvent through the channel.

In an embodiment, a microfluidic device can comprise a channel, and the channel can have a structure configured to generate chaotic advective flow (e.g., by introducing flow microvortices). The structure of the channel can also include an adhesive surface. Such structure can include SHMs, and FIGS. 13a-13i show other example structures that can introduce chaotic advective flow or chaotic advection. It is noted that the term "chaotic advective flow" is defined in the art and, thus, a skilled artisan would understand what qualifies as chaotic advective flow or chaotic advection (see, for example; Nguyen and Wu, Micromixers—a review, *J. Micromech. Microeng.*, 15 R1 (2005), which is incorporated herein by reference in its entirety).

Each structure can include at least one groove having a width of 200 µm or less and, if multiple grooves are present, a spacing between each groove of 200 µm or less. The width of each groove can be 100 µm or less and, if multiple grooves are present, the spacing between each groove can be 100 µm or less. For example, the width of each groove can be about 100 µm or 50 µm and, if multiple grooves are present, the spacing between each groove can be about 100 µm or 50 µm. The width of each groove can be 50 µm or less and, if multiple grooves are present, the spacing between each groove can be 50 µm or less. The microfluidic device can be configured to remove $PM_{2.5}$ at a removal efficiency of at least 90% and $PM_{2.5-10}$ at a removal efficiency of at least 99%. The material of the structure(s) of the device can include, for example, PDMS, silicone, a plastic material covered with an adhesive surface, or a combination thereof. A mask for filtering particulate matter can comprise at least one of the microfluidic devices and a check valve. A method of filtering particulate matter from air can include flowing the air into the channel of the microfluidic device such that chaotic advective flow (e.g., microvortices) is introduced in the air flowing within the channel.

In an embodiment, a microfluidic device can comprise: a channel; and a plurality of SHMs disposed within the channel. Each SHM can comprise a plurality of grooves each having a width of 200 µm or less and a spacing between each groove of 200 µm or less, and the plurality of SHMs can be configured to introduce microvortices in air flow within the channel. The width of each groove can be 100 µm or less and the spacing between each groove can be 100 µm or less. For example, the width of each groove can be about 100 µm or 50 µm and the spacing between each groove can be about 100 µm or 50 µm. The width of each groove can be 50 µm or less and the spacing between each groove can be 50 µm or less. The SHMs can be stacked within the channel to form a stack of SHMs, and the SHMs can be disposed such that patterns thereof alternate each half cycle, by mirroring each other, throughout the stack of SHMs. The microfluidic device can be configured to remove $PM_{2.5}$ at a removal efficiency of at least 90% and $PM_{2.5-10}$ at a removal efficiency of at least 99%. Each SHM can comprise at least 10 grooves, and each SHM can be fabricated using (and/or can comprise) PDMS. A mask for filtering particulate matter can comprise at least one of the microfluidic devices and a check valve. A method of filtering particulate matter from air can include flowing the air into the channel of the microfluidic device such that microvortices are introduced in the air flowing within the channel.

In another embodiment, a method of fabricating a microfluidic device can comprise: i) preparing a first master and a second master using photolithography; ii) casting a precursor on each of the first master and the second master; iii) curing the precursor on the first master and the second master to form a first mold and a second mold, respectively; iv) peeling the first mold off the first master and the second mold off the second master; v) sandwiching additional precursor material between the first mold and the second mold, along with a spacer between the first mold and the second mold; vi) curing the additional precursor material to form a staggered herringbone micromixers layer (SHML) comprising an SHM on both sides thereof; vii) removing the first mold, the second mold, and the spacer to obtain the SHML; viii) repeating steps i)-vii) to obtain a plurality of SHMLs; and ix) stacking the SHMLs of the plurality of SHMLs to form a stack and disposing the stack in a channel to form the microfluidic device (or the stack itself can be the microfluidic device). Each SHM can comprise a plurality of grooves each having a width of 200 µm or less and a spacing between each groove of 200 µm or less. The precursor and the additional precursor material can be PDMS. Step iii) can include baking the precursor at a temperature of about 80° C. for about 2 hours. The width of each groove can be 100

μm or less (for example, about 100 μm or about 50 μm) and the spacing between each groove can be 100 μm or less (for example, about 100 μm or about 50 μm). The SHMLs can be stacked such that patterns of the SHMs alternate each half cycle, by mirroring each other, throughout the stack. The microfluidic device can be configured to remove $PM_{2.5}$ at a removal efficiency of at least 90% and $PM_{2.5-10}$ at a removal efficiency of at least 99%. The microfluidic device can be configured to introduce microvortices in air flow within the channel. Each SHM can comprise at least 10 grooves.

In a further embodiment, after PM particles are attached to the inner surface of the microfluidic device, a solvent can be used to wash away the attached particles, such that the device can be reused after drying. The solvent can be, for example, water, ethanol, or a combination thereof (e.g., 75% ethanol (v:v, ethanol:water)).

Laminar flow, characterized with low Reynolds number, is commonly presented in microfluidic devices where dimensions of channels are tens to hundreds of microns. Mixing of the fluid in laminar flow relies on pure diffusion, and this diffusive mixing is slow even in micro-scale channels. To solve this problem, SHMs can incorporate grooves on channels to efficiently mix different components in laminar flow with a short mixing length. As a passive micromixer using chaotic advection, SHMs do not require additional external forces (e.g., acoustic, electrohydrodynamic, magnetic, and thermal) involved in the mixing process, which enables them to be easily integrated into existing microfluidic devices.[34,35] Apart from fluid mixing, microfluidic devices with SHMs can also be used in various applications such as circulating tumor cells (CTCs) capture[36-38], particles focusing and guiding[39], bacteria capture and enrichment[40], binding between DNA and magnetic beads[41], surface binding of molecules[42], enhanced liquid-air contact[43], and on-chip re-calcification of citrated whole blood[44]. Among these applications, the use of SHMs for increasing surface interactions with rare cells, bacteria, beads, and large molecules is advantageous due to high capture efficiency, high throughput, and easy integration.[45]

Figure 6:
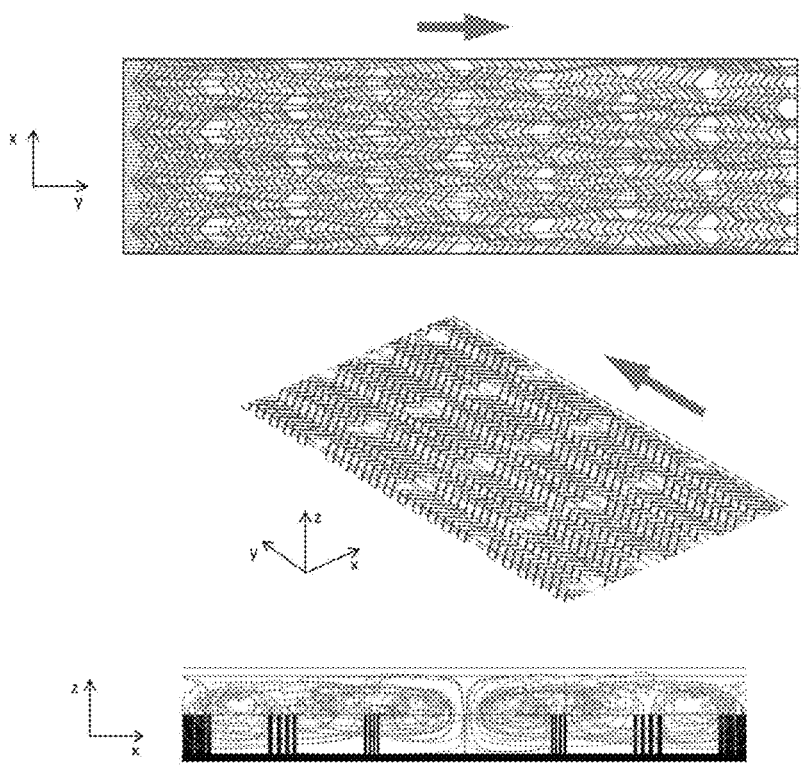
FIG. 6 shows a numerical simulation showing flow visualization in a channel with SHMs.

In microfluidic PM removal devices of embodiments of the subject invention, SHMs can be integrated in the channels to increase the interactions between PM particles and the channel surface as well as collisions between PM particles by inducing microvortices to enhance flow rotating and stretching.[46,47] This can be seen in at least FIG. 5a. Numerical simulation was conducted with COMSOL® Multiphysics 5.0 to visualize the flow in the channel with SHMs, and the results are shown in FIG. 6. Referring to the flow profile, due to the chaotic mixing from SHMs, flow streamlines keep changing directions instead of staying parallel, which is shown in flat-walled channels. In the cross-sectional view plane (XZ plane), microvortices can be clearly visualized. The detailed interactions between PM and channel surface were characterized by SEM, as seen in FIGS. 5b and 5c. When PM particles hit the channel walls, they attach to the surface and spread by deforming the shape, resulting in larger area in contact with the surface. As PM particles accumulate on the surface, new particles can attach to empty spaces, or directly attach to the PM particles that are already on the surface and merge together. Moreover, particles attached to the surface can also merge together to form larger particles when they are close enough.

Figure 9A:
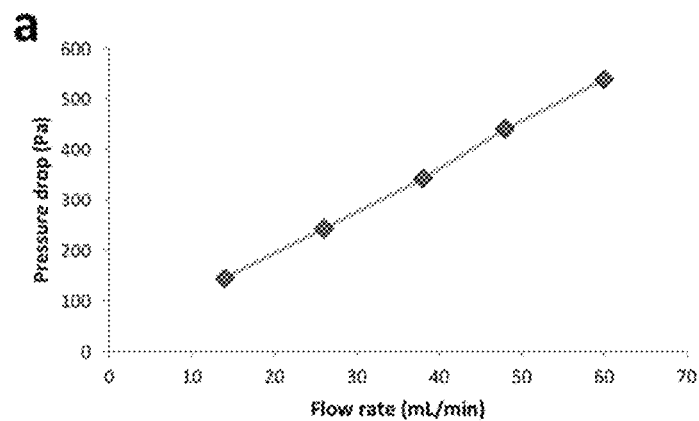
FIG. 9a shows a plot of pressure drop measurement for a device of an embodiment of the subject invention. Error bars (partially hidden by data symbols) represent standard deviation (n=3).
Figure 9B:
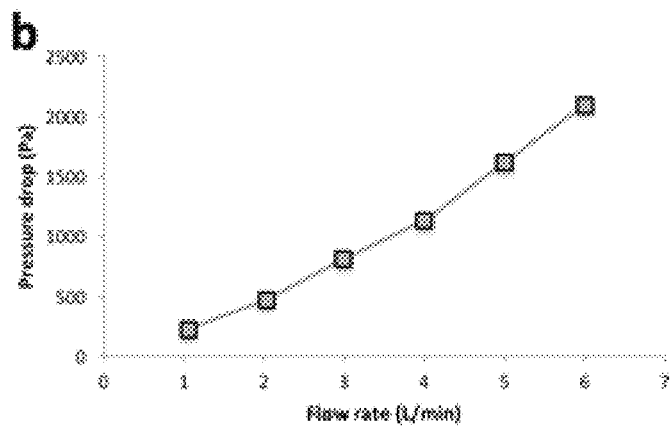
FIG. 9b shows a plot of pressure drop measurement for a related art particulate mask (circular shape with 5 cm diameter). Error bars (partially hidden by data symbols) represent standard deviation (n=3).
Figure 9C:
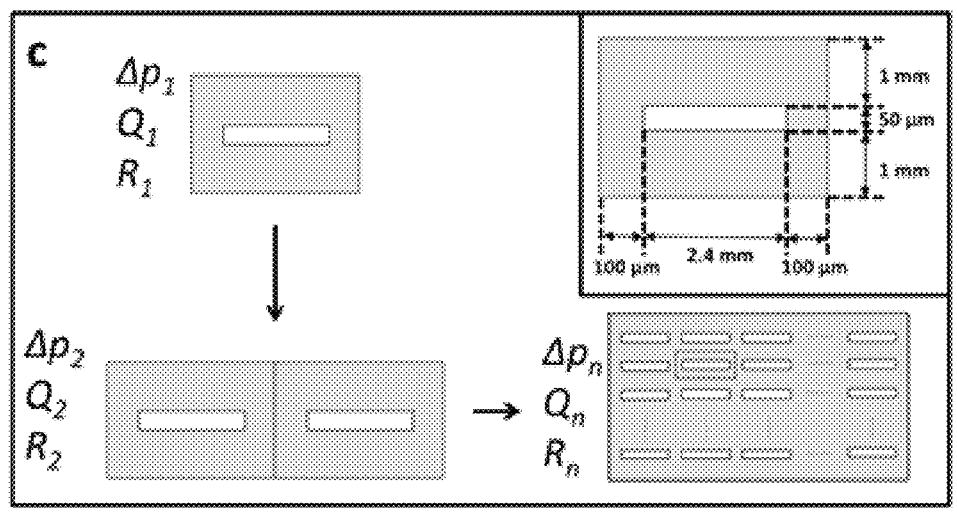
FIG. 9c shows a schematic diagram of the stacking of multiple channels with SHMs (cross sectional view), which is analogous to parallel connection in electrical circuits. The inset shows the geometrical details of a single channel.

In addition to removal efficiency, pressure drop, which is linked to air flow supply, is another important parameter for PM removal devices. It is directly associated with energy consumption and normally attributes to 70% of the total life cycle cost of an air filter.[19] The pressure drop for a device of an embodiment of the subject invention (a single channel) and a related art particulate mask were tested, as shown in FIGS. 9a and 9b, respectively. Referring to FIGS. 9a and 9b, the pressure drop rose up with an increase in flow rate. For comparison, channels with SHMs were assumed to be stacked together, providing more air flow than that of a single channel, and this is demonstrated in FIG. 9c. The geometrical details of a single channel are shown in the FIG. 9c inset. Because fluidic circuits can be analogous to electrical circuits by relating the flow rate (Q) to current (I), the pressure drop (Δp) to the voltage drop (ΔV) and the fluidic resistance (R) to the electrical resistance, an equation similar to Ohm's law can be obtained.[50]

$$\Delta p = Q \times R \tag{1}$$

Because stacking multiple channels is analogous to parallel connection in electrical circuits and each channel was assumed to provide the same flow rate ($Q_1$). $R_2$, $Q_2$, and $\Delta p_2$ for stacking two channels can be calculated in the following formulas (referring to FIG. 9c).

$$R_2 = \tfrac{1}{2} R_1 \tag{2}$$

$$Q_2 = 2 Q_1 \tag{3}$$

$$\Delta p_2 = Q_2 \times R_2 = Q_1 \times R_1 = \Delta p_1 \tag{4}$$

Equation (4) can be extended to any number of channels stacking together, considering the increase of flow rate is canceled out by the decrease of resistance.

$$\Delta p_n = Q_n \times R_n = Q_1 \times R_1 = \Delta p_1 \tag{5}$$

Based on Equation (5), to provide the comparable flow rate range of a related art particulate mask (1-6 L/min), 100 channels need to be stacked together (flow rate increases 100 times). In this case, the cross-sectional area of multiple channels can be 5.3 $cm^2$ according to the previous assumptions. Compared with the related art particulate mask (circular shape with a diameter of 5 cm) with a cross-sectional area of 19.6 $cm^2$, multiple channels with SHMs can supply the same range of flow rate with lower cross-sectional area and lower pressure drop. The number of channels stacking together can be determined by flow rate and pressure drop requirements for different applications. For example, to supply an average flow rate of a human breathing at rest (5 L/min), 334 channels are required if each channel supplies a flow rate of 15 mL/min.

Figure 10:
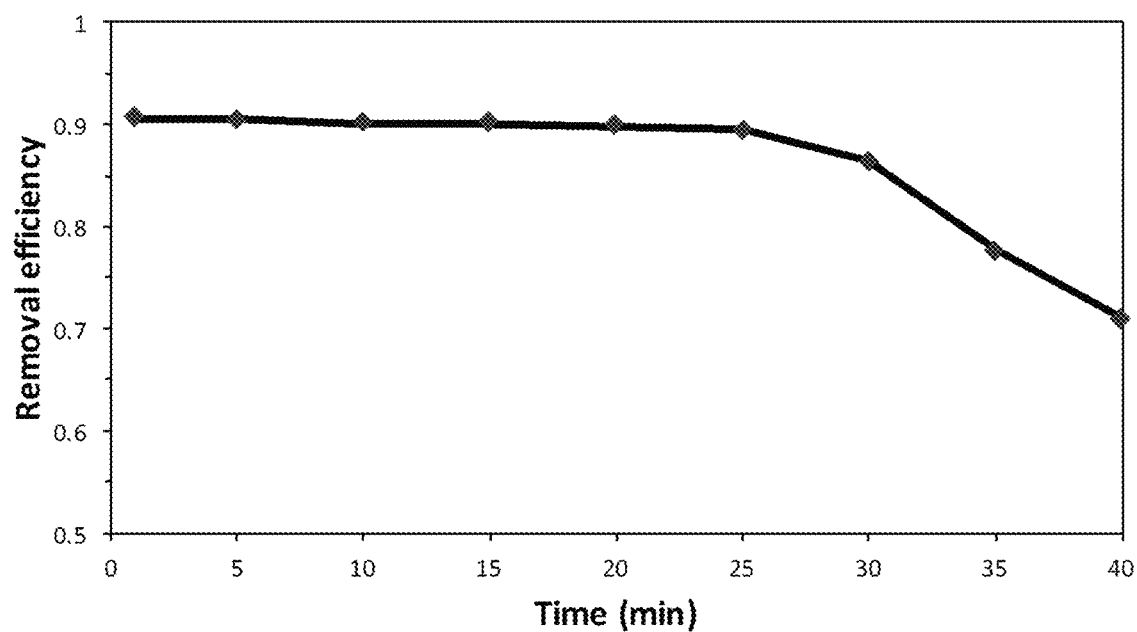
FIG. 10 shows a plot of long-term performance of a device of an embodiment of the subject invention, evaluated by measuring removal efficiency for $PM_{2.5}$ over time under "Hazardous" pollution level ($PM_{2.5}$ of about 800 μg/m$^3$).

The long-term performance of devices of embodiments of the subject invention can be evaluated by measuring removal efficiency for $PM_{2.5}$ over time under the polluted condition of "Hazardous" level ($PM_{2.5}$~800 μg/$m^3$) and a flow rate of 15 mL/min. Service life can be defined as the period of time within which the removal efficiency can maintain >90% of the maximum. Referring to FIG. 10, when exposed to a high concentration of smoke, the service life of the device was about 30 min and the removal efficiency declined to ~70% after 40 min. The decrease of removal efficiency could be due to saturation of channel surface because PM particles accumulate and cover the herringbone-shaped grooves, which weakens the chaotic mixing effect. It is noted that the highest pollution level set by the EPA ("Hazardous", $PM_{2.5}$>250 μg/$m^3$) was used here and the time for efficient PM removal could be extended under the second-highest level (~110 min, "Very Unhealthy" level, $PM_{2.5}$~200 μg/$m^3$) and the third-highest level (~220 min, "Unhealthy" level, $PM_{2.5}$~100 μg/$m^3$).

Figure 11:
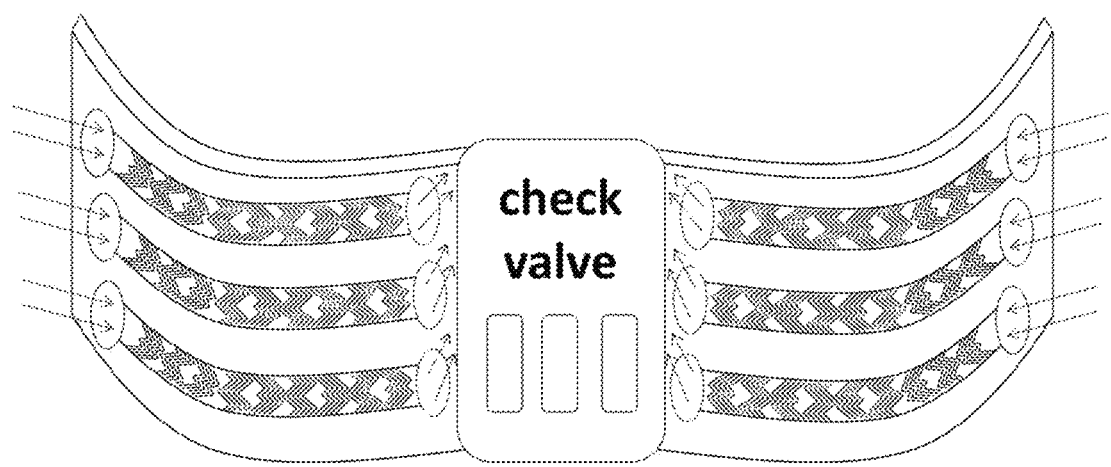
FIG. 11 shows a schematic showing a device according to an embodiment of the subject invention.

One of the potential applications for PM removal devices is use in PPE to protect individuals from exposure to harmful PM. FIG. 11 shows a schematic showing a device according to an embodiment of the subject invention. Referring to FIG. 11, a particulate mask can be used as a PPE. The mask can include two PM removal units and one check valve. For each PM removal unit, multiple layers of PM removal channels with SHMs can be fabricated inside. In each layer, channels with SHMs can be positioned in a parallel manner and fabricated in one replica (e.g., one PDMS replica). Air inlets can be open on the outside layer to connect to the ambient environment while air outlets can be open on the inside layer, facing the nose and mouth of the user of the mask. To improve the user experience by further reducing the pressure drop when exhaling, a check valve, as in a typical design of related art commercial particulate masks, can be integrated in the mask to regulate air flowing in one direction from inside to outside and inhibit or prevent backflow. When the user inhales, the check valve is closed, allowing air to flow into the channels with SHMs via the inlets on the outside layer; particles are removed when passing through channels and clean air exits from the outlets on the inside layer. When the user exhales, the check valve is open, allowing air to flow through it without resistance. Further, PDMS is a suitable material to be used in the mask due to its non-toxicity, chemical inertness, elasticity, gas permeability, and transparency. Non-toxicity and chemical inertness allows the mask to be contact with a human user's skin and used as a particulate mask while elasticity enables formation of leak-proof masks according to different facial frame sizes. Because gas molecules are able to penetrate through PDMS, sweat can evaporate out, improving the user experience. Apart from appearance concerns, optical-transparent PDMS facilitates visualization of PM accumulation on the channel surface, which can serve as an indicator to remind the user of the need for a replacement mask.

Figure 12:
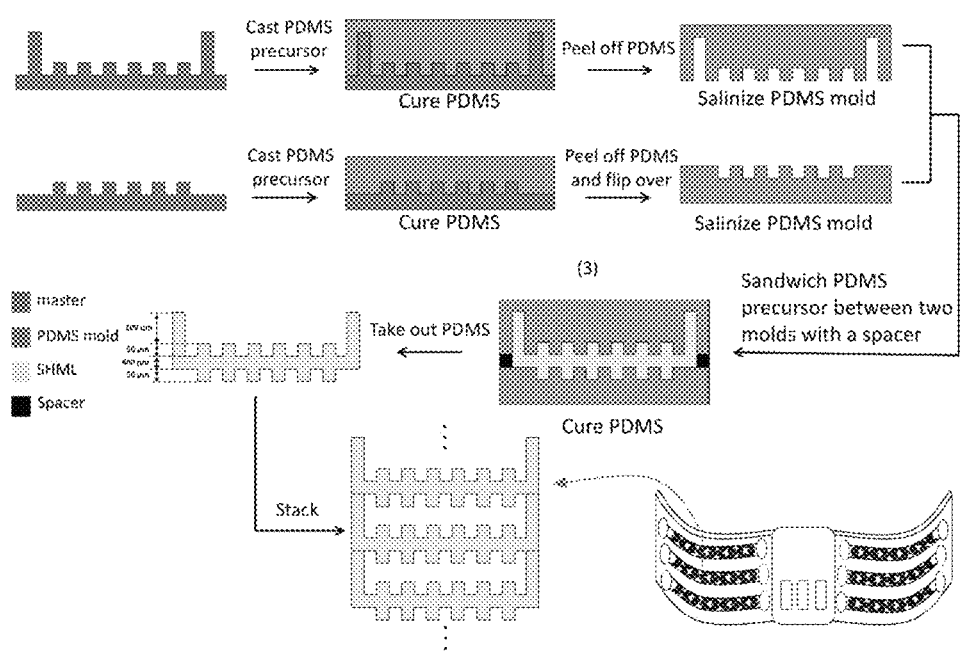
FIG. 12 shows schematic diagrams showing fabrication of multiple layers of PM removal channels with SHMs. The final stacked SHMLs show the cross sectional view of the dashed line across the device schematic at the bottom-right side of FIG. 12.
Figure 13A:
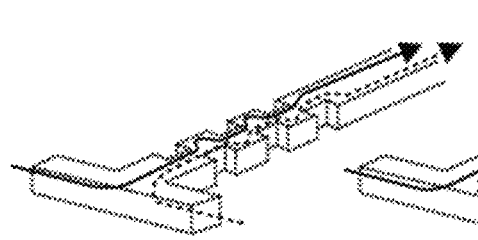
FIGS. 13a-13i show channel designs that generate chaotic advection, according to embodiments of the subject invention.
Figure 13B:
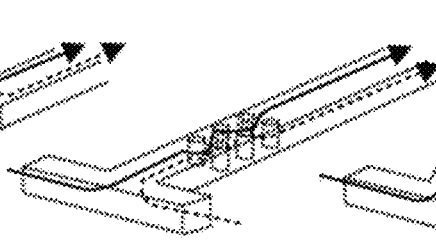
Figure 13C:
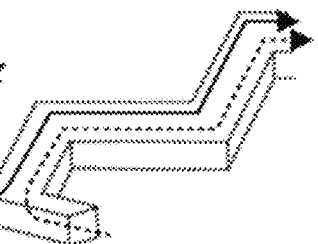
Figure 13D:
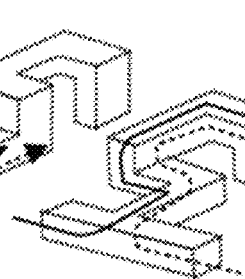
Figure 13E:
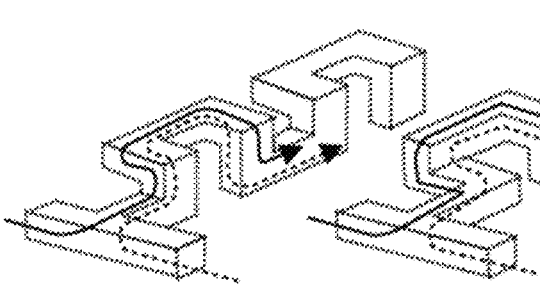
Figure 13F:
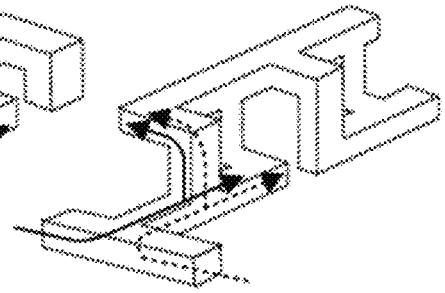
Figure 13G:
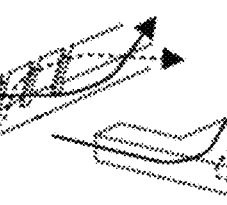
Figure 13H:
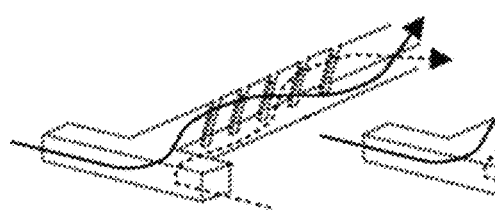
Figure 13I:
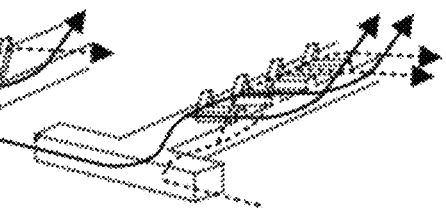

FIG. 12 shows schematic diagrams showing fabrication of multiple layers of PM removal channels with SHMs. The final stacked SHMLs show the cross sectional view of the dashed line across the device schematic at the bottom-right side of FIG. 12. Referring to FIG. 12, two masters can be produced by a standard photolithographic technique and salinized. Second, a precursor (e.g., a PDMS precursor (10:1)) can be respectively cast on the two masters and baked (e.g., at 80° C.) for 2 h; after curing, two molds (e.g., PDMS molds) can be peeled off from the masters and salinized for better release. Next, precursor (e.g., PDMS precursor (10:1)) can be sandwiched between two molds with a spacer and cured. A staggered herringbone micro-mixers layer (SHML) that contains SHMs on both sides can be obtained. Then, multiple SHMLs can be stacked to form the multiple layers of PM removal channels.

PM generated by incense burning consists of very small liquid droplets. It is expected that rigid particles such as dust can also attach to the surface (e.g., PDMS surface) and that surface modification (e.g., coating the surface with a thin layer of liquid such as PDMS prepolymer) can increase the removal efficiency and extend service life of a microfluidic device of embodiments of the subject invention.

Conventional PM removal devices utilize filtering mechanisms to remove PM. In order to filter a PM, the mesh/pore size of the filter must be smaller than the diameter of the PM. Taking $PM_{2.5}$ as an example, to filter a 2.5 μm particle, the pores must be smaller than 2.5 μm. However, when the pores go smaller, the gas will be more difficult to pass through, which accounts for the pressure drop. This is why it often feels more difficult to breathe when wearing an N95 mask compared to an N80 mask. Embodiments of the subject invention solve this problem. The unique mechanism of generating microvortices in the air flow and greatly enhancing chaotic advection allows removal of small particles with a much larger "pore" (cross-sectional area of a channel). For example, $PM_{2.5}$ can be effectively removed with a channel that is 100 μm in height. That means the pressure drop in the devices of embodiments of the subject invention is much smaller than in related art filter-based masks, given the same removal efficiency. Thus, devices of embodiments of the subject invention are superior for use as a facial mask.

Following are examples that illustrate procedures for practicing embodiments of the invention. These examples should not be construed as limiting.

Example 1—Device Fabrication

A microfluidic device was fabricated and comprised a PDMS (RTV615, GE Silicones, USA) structure bonded to a PDMS slab, and this was done using standard soft lithography techniques. Two-layer masters were fabricated by photolithography patterning negative photoresist SU-8 (MicroChem, USA), onto a silicon wafer. The device layout was designed in AutoCAD (AutoDesk Inc.) to produce a film photomask containing desired patterns. The silicon wafer was first spin-coated with a 50 μm height SU-8 2050 at 3000 rpm. After soft baking at 95° C. for 7 min, UV light exposure through the photomask with channel patterns, and post exposure baking at 95° C. for 6 min and development, the main channel layer was fabricated. Then, another layer of photoresist SU-8 2050 with a 100 μm height was spun on the same substrate at 1750 rpm. After soft baking at 95° C. for 16 min and precise alignment between main channels and SHMs patterns, a second UV light exposure was performed, followed by post exposure baking at 95° C. for 9 min and development. The masters were coated by trichloro(1H,1H,2H,2H-perfluorooctyl)silane (PFOTS, Sigma-Aldrich) to facilitate release of replica. The PDMS (10:1, weight ratio of prepolymer:curing agent) was cast on the masters and baked in an oven at 80° C. for 3 hours. After peeling off from the masters, the PDMS structures were punched to generate inlets and outlets, PDMS slabs were fabricated by curing the PDMS (10:1) in a glass Petri dish at 80° C. for 3 hours. Then, the PDMS structure and PDMS slab were irreversibly bonded with plasma treatment (PDC-32 G, Harrick Plasma) for 30 seconds at high power setting (18 W). FIGS. 1(a)-1(d) show schematic diagrams and micrographs of two designs of SHMs. Referring to FIGS. 1(a)-1(d), the main channel was 2.4 mm wide, 50 μm high, and 50 mm long with 50 μm high herringbone grooves embedded on the ceiling. The grooves were 100 μm or 50 μm wide and spaced 100 μm or 50 μm apart from each other. Each cycle of SHMs included 10 grooves, and the patterns were alternated for each half cycle in a mirrored direction.

Example 2—Characterization of Removal Efficiency

Figure 2A:
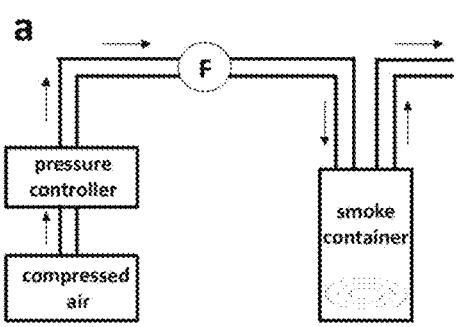
FIG. 2a shows a schematic of an experimental setup for characterization of removal efficiency.
Figure 2B:
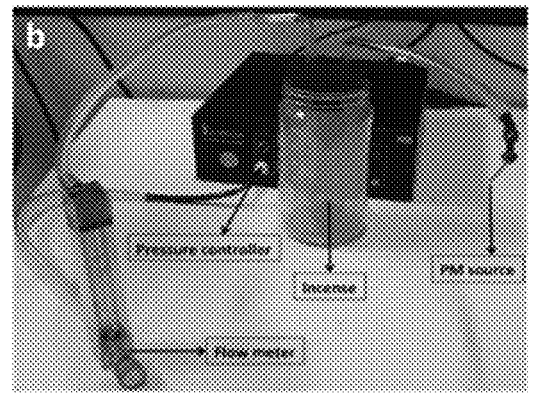
Figure 3:
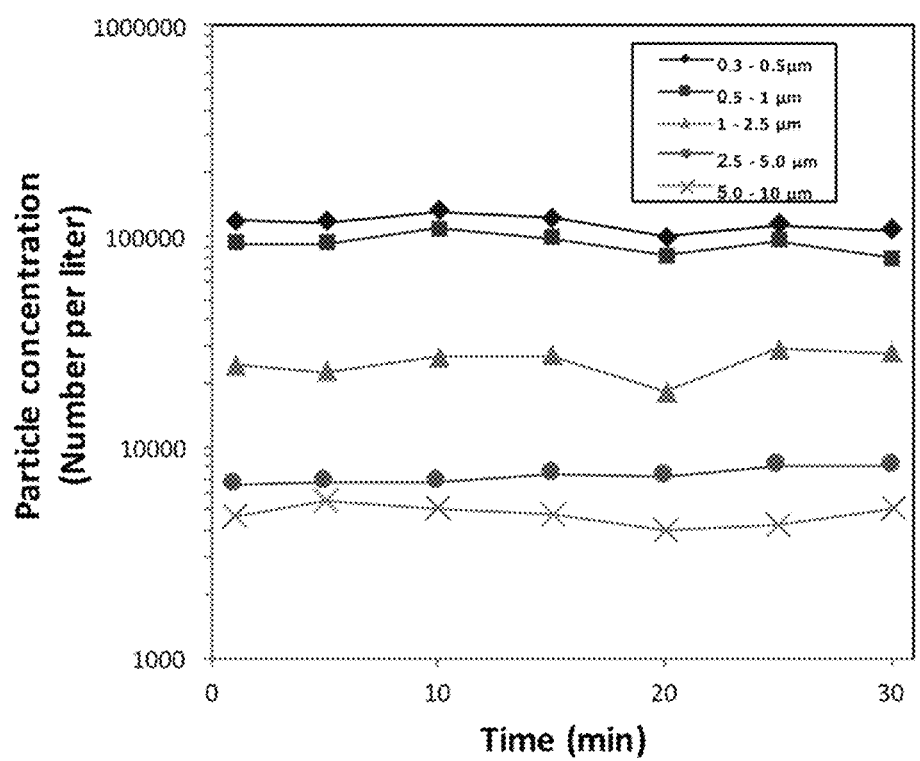
FIG. 3 shows a graph of size distribution of PM particles generated by burning incense over time.

FIG. 2(a) shows a schematic of an experimental setup for characterization of removal efficiency. In a confined environment (a smoke container), the model PM was generated by burning incense.[20,21,32] The concentration of PM source was controlled to a pollution level equivalent to "Hazardous" standard set by the EPA ($PM_{2.5}$>250 μg/m³) by diluting the smoke with air. The size distribution of PM particles generated by burning incense showed that most of the PM particles were less than 1 μm within the range from 300 nm to 10 μm and the particle concentration of each size range was relatively stable, as seen in FIG. 3. A pneumatic pressure controller (OB1, Elveflow) coupled with a flow meter was used to regulate the dilution process. An airborne particle counter (CEM) was used to measure the number concentration of PM particles before ($C_{before}$) and after ($C_{after}$) passing through the device. The removal efficiency (RE) was calculated by the equation, $RE=1-C_{after}/C_{before}$.

A microscope (AZ100, Nikon) coupled with a CCD camera (DS-Fi1, Nikon) was used to observe the inner surface of channels containing SHMs. The details of interaction between PM particle and channel surface were characterized by a scanning electron microscope (SEM, JSM 6490, JEOL). A 15 nm gold layer was deposited onto the PDMS structure in a gold sputter coater (S150B, Edwards). Next, the PDMS structure was mounted on the plane of metal stub with double-sided conductive sticky tape. The specimens were then observed under the SEM and images were taken at a 10 kV accelerating voltage at 200× and 1500× magnifications. This setup was used for Examples 3-5.

Example 3—Removal Efficiency

Figure 7A:
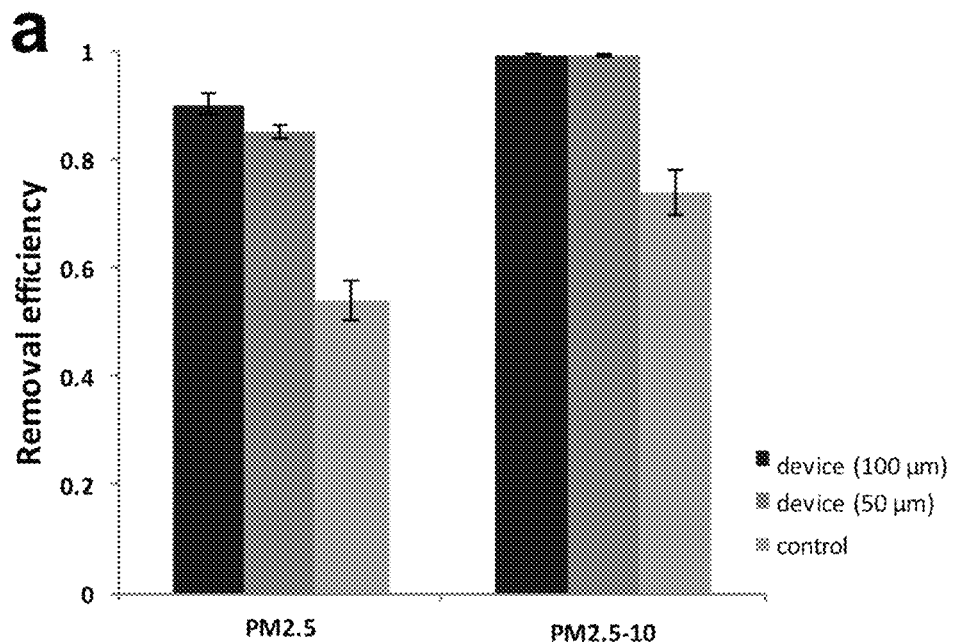
FIG. 7a shows $PM_{2.5}$ and $PM_{2.5-10}$ removal efficiencies for microfluidic devices containing SHMs with 100 μm wide grooves (left-most bars) and with 50 μm wide grooves (middle bars), and control (right-most bars).

Removal efficiencies were characterized to compare channels with SHMs (100 μm or 50 μm wide grooves) and flat-walled channels without SHMs (control) at a flow rate of 15 mL/min. FIG. 7a shows the $PM_{2.5}$ and $PM_{2.5-10}$ removal efficiencies for microfluidic devices containing SHMs with 100 μm wide grooves (left-most bars) and with 50 μm wide grooves (middle bars), and control (right-most bars). The channels with 100 μm wide grooves can remove 90.8%±1.5% of $PM_{2.5}$ and 99.4%±0.2% of $PM_{2.5-10}$ while the channels with 50 μm wide grooves can remove 85.0%±1.4% of $PM_{2.5}$ and 99.3%±0.3% of $PM_{2.5-10}$. The devices with SHMs have higher $PM_{2.5}$ and $PM_{2.5-10}$ removal efficiencies than those of the control (removal efficiency: 54.1%±3.7% for $PM_{2.5}$ and 74.0%±3.6% for $PM_{2.5-10}$). The results confirm that the chaotic mixing effects of SHMs can increase the chance that PM particles attach to the channel surface. In addition, channels with 100 μm wide grooves demonstrated slightly higher removal efficiency than that of channels with 50 m wide grooves. As shown in the SEM images of FIGS. 5b and 5c, a large portion of PM particles were attached in the groove area, especially at the bottom of the groove, which suggests that the PM particles were more likely to be trapped in the grooves. Therefore, increase of groove width can increase the chance for PM particles to hit channel surface. The results that wider grooves have higher capture efficiency are also supported by simulation and experimental studies.[40,45,48] Thus, devices with 100 μm wide grooves were used in Example 4.

Example 4—Removal Efficiency

Numerical simulation was also performed with COMSOL® Multiphysics 5.0 to investigate the removal efficiency for devices of embodiments of the subject invention. The simulation model contained 8 cycles of SHMs while other geometrical details were the same with the device. The removal of particles was defined as direct contact between particles and channel surface, and particles were set as solid spheres with zero mass and a diameter of 0.5 μm. The release mode of particles was mesh-based and the removal efficiency was 83.1%. The difference of removal efficiency between numerical simulation and the real experiment was a result of the strict assumptions used in the simulation model such as zero mass, solid spherical structure of particles, and positive removal upon direct contact.[40]

Example 5—Removal Efficiency for Different Particle Size Ranges

Figure 7B:
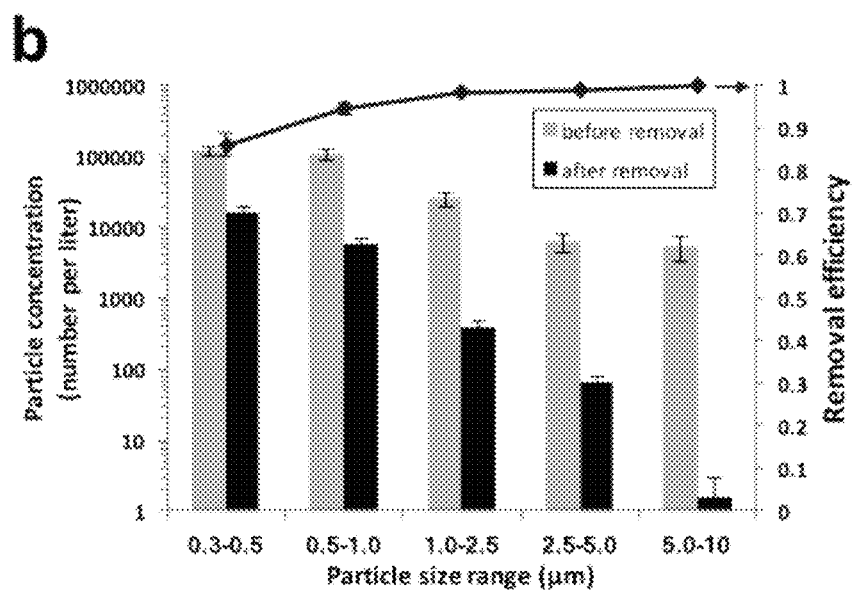
FIG. 7b shows PM removal efficiencies for microfluidic devices containing SHMs with 100 μm wide grooves for different particle size ranges.
Figure 8A:
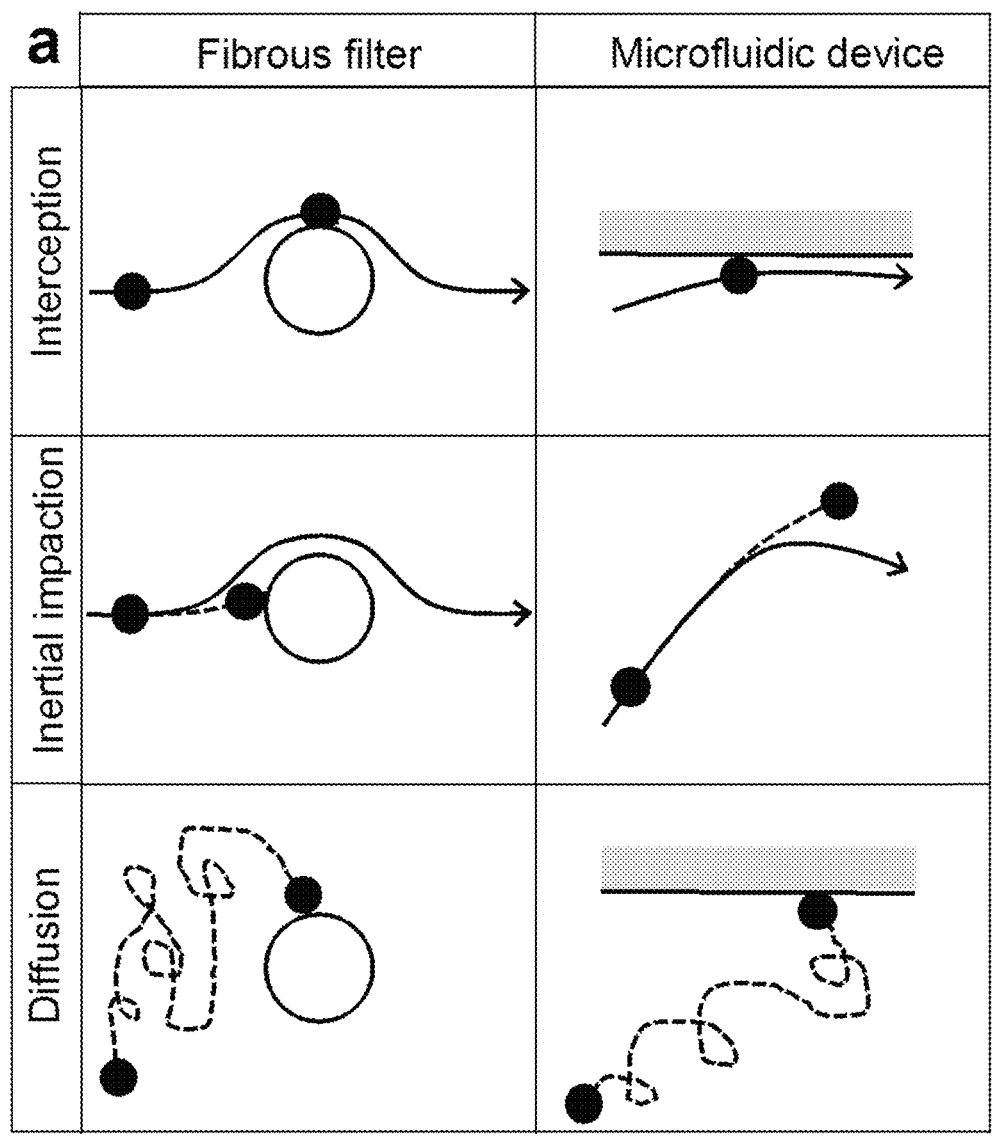
FIG. 8a shows a table of schematic diagrams of three PM (black dots) removal mechanisms (diffusional collection, interception, and inertial impact) for fibrous filters (left column) and microfluidic devices of embodiments of the subject invention (right column).
Figure 8B:
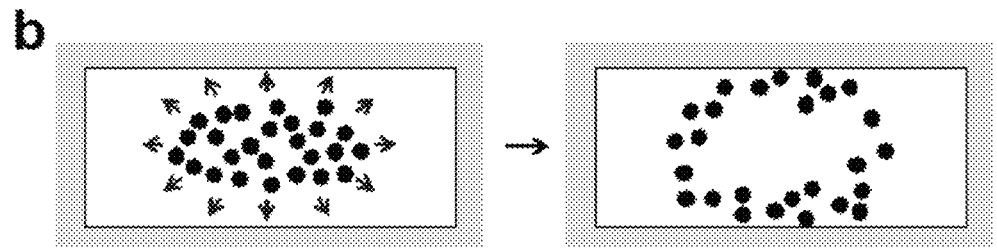
FIG. 8b shows a schematic diagram (cross sectional view of the channel) showing the centrifugal effect induced by SHMs that drives particles to move toward channel walls. Arrows represent the direction of particle movement.

PM removal efficiencies for different particle size ranges were investigated. FIG. 7b shows PM removal efficiencies for microfluidic devices containing SHMs with 100 μm wide grooves for different particle size ranges. Among all particle size ranges, particle concentrations significantly decreased after passing through the device, which indicates a high percentage of PM particles were removed by the device. Moreover, removal efficiencies rose up with the increase of particle size, and they were more than 94% for all particle ranges except 0.3-0.5 μm (86.0%±2.8%). The mechanisms for fibrous filters to remove particles larger than 0.3 μm can be categorized into three types—diffusional collection, interception, and inertial impact.[18,49] These are shown in FIG. 8a. For diffusional collection, the particle deviates from streamline because of Brownian movement and hits the fiber eventually. For interception, the particle travels along the streamline and impacts the fiber because the distance between them is less than particle radius. For inertial impact, the particle cannot adjust according to the change of streamline because of inertia, resulting in deviation from the streamline and impact onto the fiber. Interception and inertial impact dominate in removal of larger particles while diffusional collection starts to play a significant role when particle diameter is less than 1 μm. These three mechanisms can also be used to explain the PM removal in microfluidic devices of embodiments of the subject invention. In channels, diffusional collection and interception occur when the particle follows the streamline and comes close enough to the channel walls. The closer the streamline to the channel wall the higher chance that the particle attaches to the channel surface. In flat-walled channels, due to smooth flow streamlines, particles follow the streamlines not close to the channel walls and have a lower chance to be in contact with channel surface, resulting in low removal efficiency. Particle deviation from the streamlines by inertial force is enhanced because microvortices generated by SHMs force the streamline to change constantly, especially in a cross-sectional plane of the channel, where the change of streamline is frequent and abrupt, as seen in FIG. 6. This process is similar with centrifuge, forcing particles in the middle of channels to move toward channel walls and attach to the channel surface eventually, as shown in FIG. 8b.

Example 6—Characterization of Pressure Drop

FIG. 4a shows a schematic of an experimental setup for pressure drop measurement across a microfluidic device; FIG. 4b shows a photograph of the experimental setup of FIG. 4a; FIG. 4c shows a schematic of an experimental setup for pressure drop measurement across a related art particulate mask; and FIG. 4d shows a close-up of a portion of the experimental setup of FIG. 4c. A pneumatic pressure controller (OB1, Elveflow) coupled with a flow meter was used to regulate the inlet air flow. The pressure drop was measured by a differential pressure gauge (CEM). Two three-way push connectors (SMC Corporation) were used to make a connection between main air flow and the detection ports of pressure gauge. For measuring pressure drop of a related art particulate mask, a mask holder consisting of two hat-shaped components was fabricated by a FDM-based 3D printer (FIG. 4d). A silicone O-ring was fixed on each of hat-shaped component. A part of the related art particulate mask in a circular shape (d=5 cm) was clamped tightly against O-rings in the middle of the mask holder to ensure gas-tight sealing. This setup was used for Example 7.

Example 7—Pressure Drop Measurement

The pressure drop for a device of an embodiment of the subject invention (a single channel) and a related art particulate mask were tested, as shown in FIGS. 9a and 9b, respectively. Referring to FIGS. 9a and 9b, the pressure drop rose up with an increase in flow rate. The pressure drop for the related art particulate mask was much higher, even at lower flow rates, than the pressure drop for the device of an embodiment of the subject invention.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

1 *United States Environ. Prot. Agency*, https://www.epa.gov/pm-pollution/particulate-matte.
2 R. D. Brook, B. Franklin, W. Cascio, Y. Hong, G. Howard, M. Lipsett, R. Luepker, M. Mittleman, J. Samet, S. C. Smith and I. Tager, *Circulation*, 2004, 109, 2655-2671.
3 D. W. Dockery, C. A. Pope, X. Xu, J. D. Spengler, J. H. Ware, M. E. Fay, B. G. Ferris and F. E. Speizer, *N. Engl. J. Med.*, 1993, 329, 1753-1759.
4 A. Nel, *Science*, 2005, 308, 804-806.
5 J. C. Chow, J. G. Watson, J. L. Mauderly, D. L. Costa, R. E. Wyzga, S. Vedal, G. M. Hidy, S. L. Altshuler, D. Marrack, J. M. Heuss, G. T. Wolff, C. Arden Pope III and D. W. Dockery, *J. Air Waste Manage. Assoc.*, 2006, 56, 1368-1380.
6 R. M. Harrison and J. Yin, *Sci. Total Environ.*, 2000, 249, 85-101.
7 *Air Quality Guidelines*, World Health Organisation, 2006.
8 J. M. Samet, F. Dominici, F. C. Curriero, I. Coursac and S. L. Zeger, *N. Engl. J. Med.*, 2000, 343, 1742-1749.
9 K. D. A. Seaton, D. Godden, W. MacNee, *Lancet*, 1995, 334, 176-178.
10 S. C. Anenberg, L. W. Horowitz, D. Q. Tong and J. J. West, *Environ. Health Perspect.*, 2010, 118, 1189-1195.
11 E. Underwood, *Science*, 2017, http://www.sciencemag.org/news/2017/01/brain-pollu.
12 R. Zhang, J. Jing, J. Tao, S.-C. Hsu, G. Wang, J. Cao, C. S. L. Lee, L. Zhu, Z. Chen, Y. Zhao and Z. Shen, *Atmos. Chem. Phys.*, 2013, 13, 7053-7074.
13 R. A. Rohde and R. A. Muller, *PLoS One*, 2015, 10, e0135749.
14 J. Sievert and F. Löffler, *Chem. Eng. Process.*, 1989, 26, 179-183.
15 B. Bretschneider and J. Kurfurst, *Air pollution control technology*, Elsevier, 1987.
16 F. Richard c. and S. Jhon H., *Fundamentals of air pollution engineering*, Prentice-Hall, Berlin/Heidelberg, 1988.
17 H. E. Hesketh, *Air pollution control Traditional and hazardous pollutants*, Technomic publishing, 1996.
18 W. C. Hinds, *Aerosol technology: properties, behavior, and measurement of airborne particles*, Wiley, 2nd edn., 1999.
19 P. Li, C. Wang, Y. Zhang and F. Wei, *Small*, 2014, 10, 4553-4561.
20 C. Liu, P.-C. Hsu, H.-W. Lee, M. Ye, G. Zheng, N. Liu, W. Li and Y. Cui, *Nat. Commun.*, 2015, 6, 6205.
21 R. Zhang, C. Liu, P.-C. Hsu, C. Zhang, N. Liu, J. Zhang, H. R. Lee, Y. Lu, Y. Qiu, S. Chu and Y. Cui, *Nano Lett.*, 2016, 16, 3642-3649.
22 N. Wang, X. Wang, B. Ding, J. Yu and G. Sun, *J. Mater. Chem.*, 2012, 22, 1445.
23 K. Yoon, B. S. Hsiao and B. Chu, *J. Mater. Chem.*, 2008, 18, 5326.
24 Y. C. Ahn, S. K. Park, G. T. Kim, Y. J. Hwang, C. G. Lee, H. S. Shin and J. K. Lee, *Curr. Appl. Phys.*, 2006, 6, 1030-1035.
25 Y. Zhang, S. Yuan, X. Feng, H. Li, J. Zhou and B. Wang, *J. Am. Chem. Soc.*, 2016, 138, 5785-5788.
26 Y. H. Kim, J. Y. Maeng, D. Park, I. H. Jung, J. Hwang and Y. J. Kim, *Appl. Phys. Lett.*, 2007, 91, 1-4.
27 I. Paprotny, F. Doering, P. A. Solomon, R. M. White and L. A. Gundel, *Sensors Actuators, A Phys.*, 2013, 201, 506-516.
28 S. C. Hong, J. S. Kang, J. E. Lee, S. S. Kim and J. H. Jung, *Lab Chip*, 2015, 15, 1889-97.
29 A. M. Schaap, W. C. Chu and B. Stoeber, *IEEE Sens. J.*, 2011, 11, 2790-2797.
30 I. Mirzaee, M. Song, M. Charmchi and H. Sun, *Lab Chip*, 2016, 26, 2254-2264.
31 Y. Xia and G. M. Whitesides, *Annu. Rev. Mater. Sci.*, 1998, 28, 153-184.
32 Y. Chen, S. Zhang, S. Cao, S. Li, F. Chen, S. Yuan, C. Xu, J. Zhou, X. Feng, X. Ma and B. Wang, *Adv. Mater.*, 2017, 1606221.
33 A. D. Stroock, *Science*, 2002, 295, 647-651.
34 C. Y. Lee, C. L. Chang, Y. N. Wang and L. M. Fu, *Int. J. Mol. Sci.*, 2011, 12, 3263-3287.
35 N.-T. Nguyen and Z. Wu, *J. Micromechanics Microengineering*, 2005, 15, R1-R16.
36 S. Wang, K. Liu, J. Liu, Z. T. F. Yu, X. Xu, L. Zhao, T. Lee, E. K. Lee, J. Reiss, Y. K. Lee, L. W. K. Chung, J. Huang, M. Rettig, D. Seligson, K. N. Duraiswamy, C. K. F. Shen and H. R. Tseng, *Angew. Chemie—Int. Ed.*, 2011, 50, 3084-3088.
37 S. L. Stott, C.-H. C.-H. Hsu, D. I. Tsukrov, M. Yu, D. T. Miyamoto, B. a. Waltman, S. M. Rothenberg, A. M. Shah, M. E. Smas, G. K. Korir, F. P. Floyd, A. J. Gilman, J. B. Lord, D. Winokur, S. Springer, D. Irimia, S. Nagrath, L. V. Sequist, R. J. Lee, K. J. Isselbacher, S. Maheswaran, D. a. Haber and M. Toner, *PNAS*, 2010, 107, 18392-7.
38 W. Sheng, O. O. Ogunwobi, T. Chen, J. Zhang, T. J. George, C. Liu and Z. H. Fan, *Lab Chip*, 2014, 14, 89-98.
39 C.-H. Hsu, D. Di Carlo, C. Chen, D. Irimia and M. Toner, *Lab Chip*, 2008, 8, 2128-34.

40 W. Jing, W. Zhao, S. Liu, L. Li, C.-T. Tsai, X. Fan, W. Wu, J. Li, X. Yang and G. Sui, *Anal. Chem.,* 2013, 85, 5255-5262.
41 T. Lund-Olesen, M. Dufva and M. F. Hansen, *J. Magn. Magn. Mater.,* 2007, 311, 396-400.
42 J. O. Foley, A. Mashadi-Hossein, E. Fu, B. A. Finlayson and P. Yager, *Lab Chip,* 2008, 8, 557.
43 T. Femmer, M. L. Eggersdorfer, A. J. C. Kuehne and M. Wessling, *Lab Chip,* 2015, 15, 3132-3137.
44 M. Lehmann, A. M. Wallbank, K. A. Dennis, A. R. Wufsus, K. M. Davis, K. Rana and K. B. Neeves, *Biomicrofluidics,* 2015, 9.
45 T. P. Forbes and J. G. Kralj, *Lab Chip,* 2012, 12, 2634.
46 Y. Du, Z. Zhang, C. Yim, M. Lin and X. Cao, *Biomicrofluidics,* 2010, 4, 0-13.
47 M. S. Williams, K. J. Longmuir and P. Yager, *Lab Chip,* 2008, 8, 1121-9.
48 W. Jing, X. Jiang, W. Zhao, S. Liu, X. Cheng and G. Sui, *Anal. Chem.,* 2014, 86, 5815-5821.
49 I. Colbeck, Ed., *Physical and chemical properties of aerosols*, Blackie Academic & Professional, 1998.
50 D. J. Beebe, G. a Mensing and G. M. Walker, *Annu. Rev. Biomed. Eng.,* 2002, 4, 261-286.

What is claimed is:

1. A microfluidic device, comprising:
   a channel having a structure configured to generate chaotic advective flow of air within the channel,
   wherein the structure of the channel comprises an adhesive surface,
   wherein the structure of the channel comprises a plurality of staggered herringbone micromixers (SHMs) disposed within the channel,
   wherein each SHM comprises a plurality of grooves each having a width of 100 μm or less and a spacing between each groove of 100 μm or less, and
   wherein the structure of the channel generates chaotic advective flow by introducing microvortices in the air within the channel.

2. The microfluidic device according to claim 1, wherein the width of each groove is 50 μm or less and the spacing between each groove is 50 μm or less.

3. The microfluidic device according to claim 1, wherein the width of each groove is about 50 μm and the spacing between each groove is about 50 μm.

4. The microfluidic device according to claim 1, wherein the SHMs of the plurality of SHMs are stacked within the channel to form a stack of SHMs, and
   wherein the SHMs are disposed such that patterns thereof alternate each half cycle, by mirroring each other, throughout the stack of SHMs.

5. The microfluidic device according to claim 1, wherein the microfluidic device is configured to remove particulate matter with a diameter of less than 2.5 μm ($PM_{2.5}$) at a removal efficiency of at least 90%, and
   wherein the microfluidic device is configured to remove particulate matter with a diameter of from 2.5 μm to 10 μm ($PM_{2.5-10}$) at a removal efficiency of at least 99%.

6. The microfluidic device according to claim 1, wherein each SHM comprises at least 10 grooves.

7. The microfluidic device according to claim 1, wherein the structure of the channel comprises polydimethylsiloxane (PDMS), silicone, a plastic material covered with an adhesive surface, or a combination thereof.

8. The microfluidic device according to claim 1, wherein the channel has a width of at least 2.4 mm, a height of at least 50 μm, and a length of at least 50 mm.

9. The microfluidic device according to claim 1, wherein the channel has a width of at least 2.4 mm, a height of at least 50 μm, and a length of at least 50 mm,
   wherein the SHMs of the plurality of SHMs are stacked within the channel to form a stack of SHMs,
   wherein the SHMs are disposed such that patterns thereof alternate each half cycle, by mirroring each other, throughout the stack of SHMs,
   wherein each SHM comprises at least 10 grooves,
   wherein the microfluidic device is configured to remove $PM_{2.5}$ at a removal efficiency of at least 90%,
   wherein the microfluidic device is configured to remove $PM_{2.5-10}$ at a removal efficiency of at least 99%, and
   wherein each SHM comprises PDMS, silicone, a plastic material covered with an adhesive surface, or a combination thereof.

10. A mask for filtering particulate matter, the mask comprising:
    the microfluidic device according to claim 1; and
    a check valve.

* * * * *